(12) United States Patent
Harris

(10) Patent No.: US 10,175,929 B2
(45) Date of Patent: Jan. 8, 2019

(54) INTERFACE DEVICE FOR WIRELESSLY CONTROLLING AN AUDIO DEVICE

(71) Applicant: Victor Harris, Dubai (AE)

(72) Inventor: Victor Harris, Dubai (AE)

(73) Assignee: NSV Group FZCO, Dubai (AE)

( * ) Notice: Subject to any disclaimer, the term of this patent is extended or adjusted under 35 U.S.C. 154(b) by 0 days.

(21) Appl. No.: 15/178,998

(22) Filed: Jun. 10, 2016

(65) Prior Publication Data

US 2016/0364203 A1 Dec. 15, 2016

Related U.S. Application Data

(60) Provisional application No. 62/174,984, filed on Jun. 12, 2015.

(51) Int. Cl.
*G06F 3/16* (2006.01)
*B60R 16/02* (2006.01)

(52) U.S. Cl.
CPC .............. *G06F 3/162* (2013.01); *G06F 3/165* (2013.01); *B60R 16/0207* (2013.01)

(58) Field of Classification Search
CPC . G06F 3/162; G06F 3/165; B60R 2011/0294; B60R 11/02; B60R 16/0207
USPC ..................................................... 381/87, 88
See application file for complete search history.

(56) References Cited

U.S. PATENT DOCUMENTS

| | | |
|---|---|---|
| 5,721,541 A | 2/1998 | Repp et al. |
| 5,790,065 A | 8/1998 | Yaroch |
| 6,781,519 B1 | 8/2004 | Diaz |
| 8,014,540 B2 | 9/2011 | Riggs |
| 8,825,289 B2 | 9/2014 | Daly et al. |
| 2003/0007649 A1 | 1/2003 | Riggs |
| 2003/0210132 A1 | 11/2003 | Tang et al. |
| 2007/0049197 A1 | 3/2007 | Klein |

*Primary Examiner* — Vivian Chin
*Assistant Examiner* — Douglas Suthers
(74) *Attorney, Agent, or Firm* — Quinn IP Law

(57) ABSTRACT

An interface device is configured to be attached to an audio device and at least one switch within a vehicle. The audio device recognizes a predetermined voltage signal as being a desired audio characteristic and then generates an audio signal having the desired audio characteristic. The interface device includes a central processing unit (CPU) and a wireless receiver. The wireless receiver may receive a wireless data signal from a wireless device corresponding to a desired change to the audio characteristic. The wireless data signal is converted to a first voltage signal. The first voltage signal is transmitted to the CPU. The CPU transforms the first voltage signal to an audio input signal, corresponding to the predetermined voltage signal recognizable by the audio device and corresponding to the desired change to the audio characteristic. The CPU may also receive a second voltage signal, which is converted to the audio input signal.

16 Claims, 4 Drawing Sheets

INTERFACE DEVICE FOR WIRELESSLY CONTROLLING AN AUDIO DEVICE

CROSS-REFERENCE TO RELATED APPLICATIONS

This application claims the benefit of U.S. Provisional Application No. 62/174,984, filed on Jun. 12, 2015, which is hereby incorporated by reference in its entirety.

TECHNICAL FIELD

The present disclosure is related to an interface device configured for wirelessly controlling an audio device of a vehicle.

BACKGROUND

Wireless devices such as mobile phones are wirelessly connectable to a vehicles audio system. With the connection. The wireless devices may be able to send and receive telephone calls, text messages, and stream music through speakers within the vehicle.

SUMMARY

The present disclosure relates to an interface device configured to be operatively attached to an audio device that is configured to recognize a predetermined voltage signal as being an audio characteristic, and then generate an audio signal having the audio characteristic, in response to recognizing the predetermined voltage signal. The interface device includes a central processing unit (CPU) and a wireless receiver, operatively connected to the CPU. The wireless receiver is configured to receive a wireless data signal from a wireless device corresponding to a desired change to the audio characteristic. The wireless signal is converted to a first voltage signal. The first voltage is transmitted to the CPU. The CPU is configured to transform the first voltage signal to an audio input signal, corresponding to the predetermined voltage signal recognizable by the audio device and corresponding to the desired change to the audio characteristic.

Another embodiment of the disclosure provides a method of providing control of at least one audio characteristic of an vehicle audio device with an interface device. The method includes electrically connecting the interface device to an input port of the vehicle audio device. The interface device is electrically connected to at least one vehicle switch. The at least one vehicle switch corresponds to a desired change to the at least one audio characteristic of the audio device within the vehicle. The interface device includes a central processing unit (CPU) and a wireless receiver. The wireless receiver is operatively connected to the CPU. The wireless receiver is configured to receive a wireless data signal from a wireless device corresponding to a desired change to the audio characteristic. The wireless receiver converts the wireless data signal to a first voltage signal and transmits the first voltage signal to the CPU. The CPU is configured to transform the first voltage signal to an audio input signal, corresponding to the predetermined voltage signal recognizable by the audio device of the vehicle and corresponding to the desired change to the audio characteristic. The CPU is then configured to transmit the audio input signal to the audio device of the vehicle.

The above noted and other features and advantages of the present disclosure are readily apparent from the following detailed description when taken in connection with the accompanying drawings.

DETAILED DESCRIPTION

Figure 1:
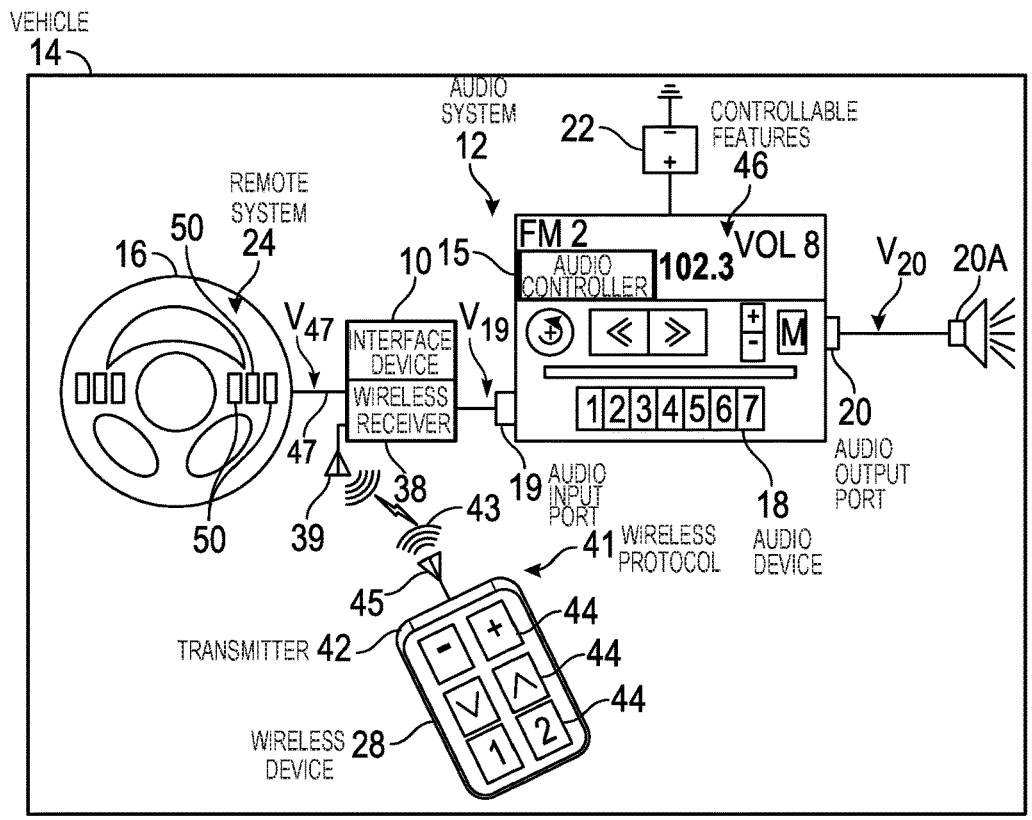
FIG. 1 is a schematic view of an interface device of an audio system of a vehicle, with the interface device in wireless communication with a wireless device.

Referring to the drawings, wherein like reference numbers refer to like components throughout the several Figures, an interface device 10 of an audio system 12 of a vehicle 14 is illustrated in FIG. 1. It should be appreciated that the vehicle 14 may be an automobile, a motorcycle, a boat, a recreational vehicle, an airplane, and the like. The vehicle 14 includes a steering wheel 16, or similar device, configured to change direction of the vehicle 14.

The audio system 12 includes the interface device 10 and an audio device 18. The audio device 18 may be a receiver, a head unit, or any other component of the audio system 12 which is configured to provide a unified hardware interface for various components of an electronic media system, e.g., AM/FM radio, satellite radio, CD player, MP3 device, and the like. As such the audio device 18 provides a user of the vehicle 14 with control over features, including audio functions, such as, volume, band, frequency, speaker balance, and other like functions. Additionally, the audio device 18 may give the user control over a component mode (e.g., AM/FM, radio, satellite, CD player, MP3, etc.). The audio device 18 includes at least one audio input port 19 and at least one audio output port 20. The audio device 18 may also be configured to generate an audio signal $V_{20}$ (i.e., sound, such as music) that is transmitted through the audio output port 20, to be broadcast from one or more speakers 20A. The audio input port 19 is configured to receive and process an audio command signal $V_{19}$, via a wired connection. The wired connection may be a wired connection to a remote audio system 24. As described in more detail below, the remote audio system 24 includes switches 50 attached to the steering wheel 16 which are operable to generate an audio input signal $V_{19}$.

The audio device 18 may be a factory installed audio device 18. As used herein, the factory installed audio device 18 means that the audio device 18 is hard-wired into the vehicle 14 at the time of construction. Factory installed may also include a replacement audio device 18 that merely replaces the factory installed audio device 18, e.g., in the event repair. The audio device 18 includes, or is otherwise in operative communication with, an input audio controller 15, configured to receive and process the audio command signal $V_{19}$ received from the audio input port 19. As such, the audio input port 19 and the input audio controller 15 are configured to receive and recognize audio command signals $V_{19}$, via the audio input port 19.

The audio command signals $V_{19}$ correspond to a desired change in an audio characteristic, to be broadcast through the speakers 20A. By way of a non-limiting example, the desired change to the audio characteristic may include, but should not be limited to, changing the volume output by the speakers 20A; searching for a next station in an AM/FM/satellite radio mode or a next track in a CD mode; mode switching between AM, FM, satellite radio, CD, etc.; selecting an auxiliary ("AUX") mode to control other features within the vehicle; and the like. The audio controller 15 modifies the audio command signal $V_{19}$ and subsequently generates the audio output signal $V_{20}$, thus incorporating the desired change to the audio characteristic, which is broadcast through the speakers 20A.

With continued reference to FIG. 1, the audio device 18 may also be operatively connected to a power supply 22, such as a conventional 12-volt battery, a 6-volt battery, and the like. The power supply 22 may be configured to supply power to the audio device 18. However, it should be appreciated that any power source known to those of skill in the art may also be used.

The interface device 10 is electrically connected to the audio device 18, at the remote input port 19. As used herein, electrically connected means a physical connection between conductors, using an electrically-conductive material, such as brass or copper. The interface device 10 may receive power from the power supply 22 via the operative connection to the remote input port 19, the operative connection to the power supply 22, or via connection to another power supply. The interface device 10 is configured to receive wireless data signals, such as Bluetooth® (BT) data signals, from one or more wireless devices 28. The wireless device 28 may include, but should not be limited to, a cellular telephone, a tablet, a computer, a handheld game system, a personal computing device, an e-reader, a wristwatch, and the like, configured to communicate wirelessly with other wireless devices.

Figure 2:
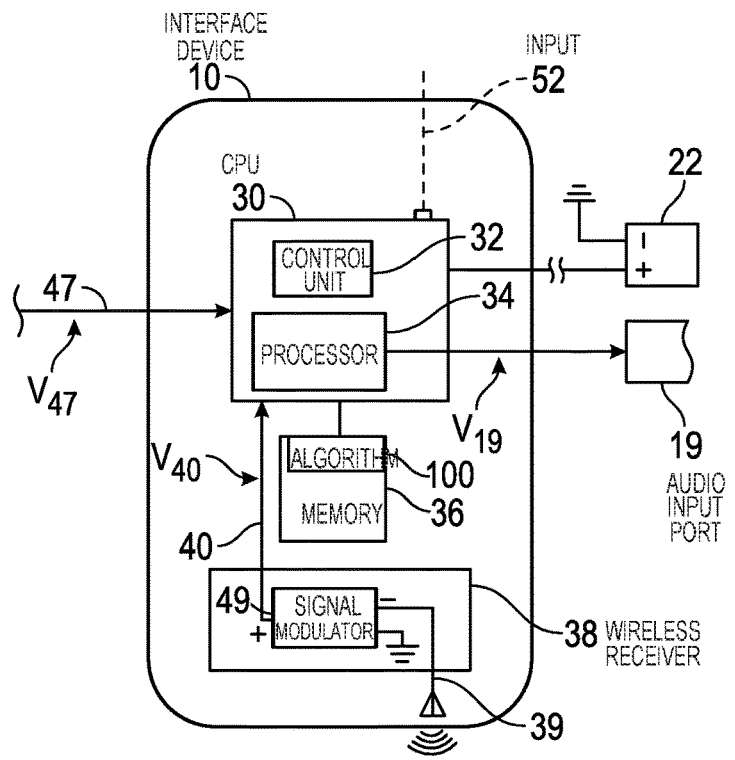
FIG. 2 is a schematic view of the interface device of FIG. 1.

Referring to FIG. 2, the interface device 10 is shown schematically. The interface device 10 includes a central processing unit 30 (CPU), a memory 36, and a wireless receiver 38. The CPU 30 includes a control unit 32 and a processor 34. The CPU 30 is in operative communication with the memory 36. An algorithm 100 (or computer program), includes a set of instructions, which are shown schematically as residing in the memory 36, or are otherwise accessible by the processor 34. The memory 36 includes, but should not limited to, tangible, non-transitory computer-readable media such as read only memory (ROM), optical memory, solid state flash memory, and the like, as well as random access memory (RAM), electrically-erasable programmable read-only memory (EEPROM), flash memory, etc., and circuitry including but not limited to a high-speed clock, analog-to-digital (A/D) circuitry, digital-to-analog (D/A) circuitry, a digital signal processor or DSP, transceivers, and the necessary input/output (I/O) devices and other signal conditioning and/or buffer circuitry, for causing the processor 34 to implement the functions embodied within the algorithm 100.

The CPU 30 carries out the instructions of the algorithm 100, by performing basic arithmetic, logical, control and input/output (I/O) operations specified by the instructions. The wireless receiver 38 is electrically connected to the CPU 30, as indicated by 40 in FIG. 2. The wireless receiver 38 is configured to selectively receive wireless signals (e.g., radiofrequency (RF) signals, optical signals, and the like) from a transmitter 42 of the wireless device 28 (shown in FIG. 1), via a wireless protocol 41. In the disclosed embodiments, the wireless protocol 41 may be a Bluetooth® (BT) protocol, where the wireless receiver 38 is a BT receiver 38, having a receiving antenna 39, and the transmitter 42 is a BT transmitter, having a transmission antenna 45. In this regard, the wireless receiver 38 of the interface device 10 and the transmitter 42 of the wireless device 28 may communicate directly with each other, via the wireless protocol 41. It should be appreciated that the wireless protocol 41 is not limited to the Bluetooth® protocol, but may include any other wireless protocol, as known to those of skill in the art, such as, Wi-Fi, radiofrequency, ZigBee®, Optical Wireless Communications (OWC), and the like. As known in the art, the interface device 10 and the wireless device 28 may be paired with one another to authenticate the devices 10, 28 with one another. This allows the receipt of signals from the wireless device 28 by the interface device 10.

With continued reference to FIG. 2, in response to a selection by the user, the wireless device 28 selectively transmits a remote audio signal 43 at a designated frequency. The wireless receiver 38, which is paired with the wireless device 28, selectively receives the remote audio signal 43. The remote audio signal 43 corresponds to a desired change to an audio characteristic of the audio system 12, as already described above. The remote audio signal 43 may be an RF signal. The wireless receiver 38 may include a signal modulator 49 (e.g., an RF modulator, an optical modulator, and the like) and the receiver antenna 39. The RF modulator 49 is configured to receive the RF signal 43 from the wireless transmitter 42 of the wireless device 28 and then convert the RF signal 43 into a first voltage signal $V_{40}$. The first voltage signal $V_{40}$ is then transmitted to the CPU 30.

Upon receipt of the first voltage signal $V_{40}$, the CPU 30 executes the algorithm 100 and converts the first voltage signal $V_{40}$ into the audio command signal $V_{19}$, which is transmitted to the audio device 18 through the audio input port 19. Referring again to FIG. 2, the audio device 18 is configured to adjust the output in response to receiving a command that is equal to a specific voltage. By way of a non-limiting example, the CPU 30 of the interface device 10 may output an audio command signal $V_{19}$ that is 2 volts (V), signifying to the audio controller 15 of the audio device 18 that the volume to be broadcast from the audio output 20, e.g., the speakers 20A, needs to increase. Similarly, an audio command signal $V_{19}$ that is 3V may signify to the audio device 18 that the volume needs to decrease. Other voltages may signify changing the station/track of a CD, changing the mode, changing the mode, and the like.

Figure 3:
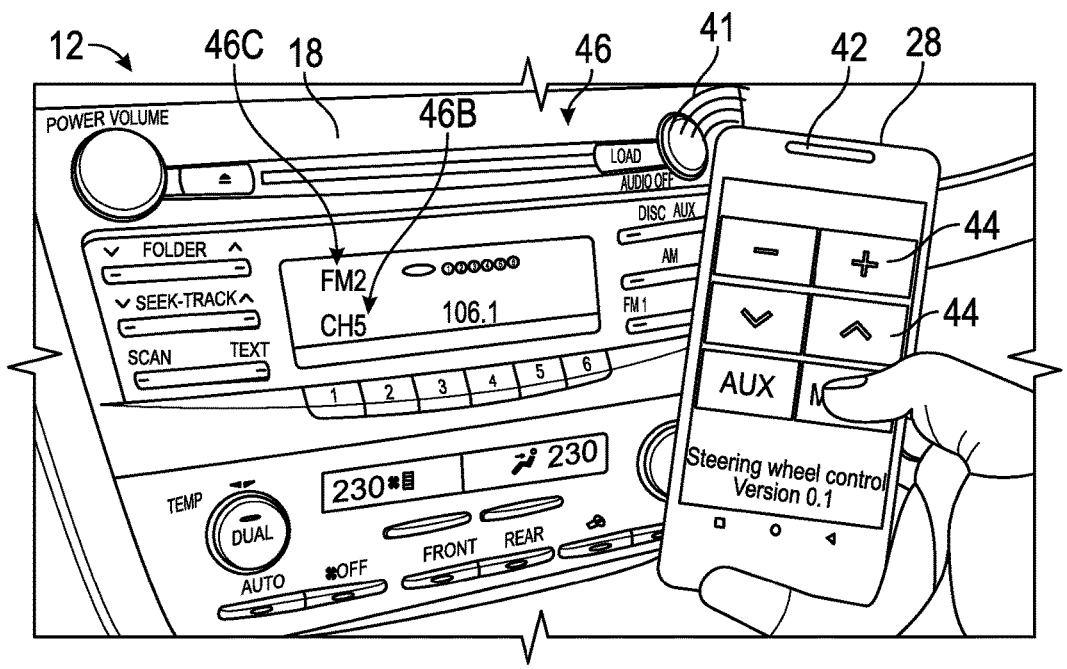
FIGS. 3-5 are schematic views of the wireless device controlling audio characteristics of an audio device of the audio system.
Figure 4:
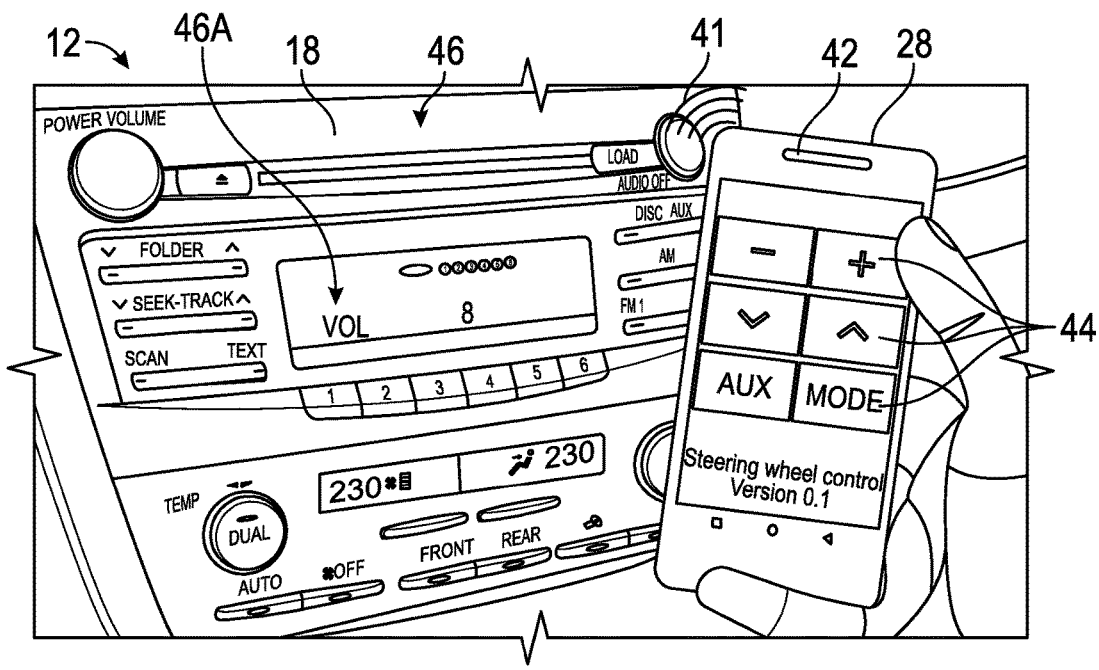
Figure 5:
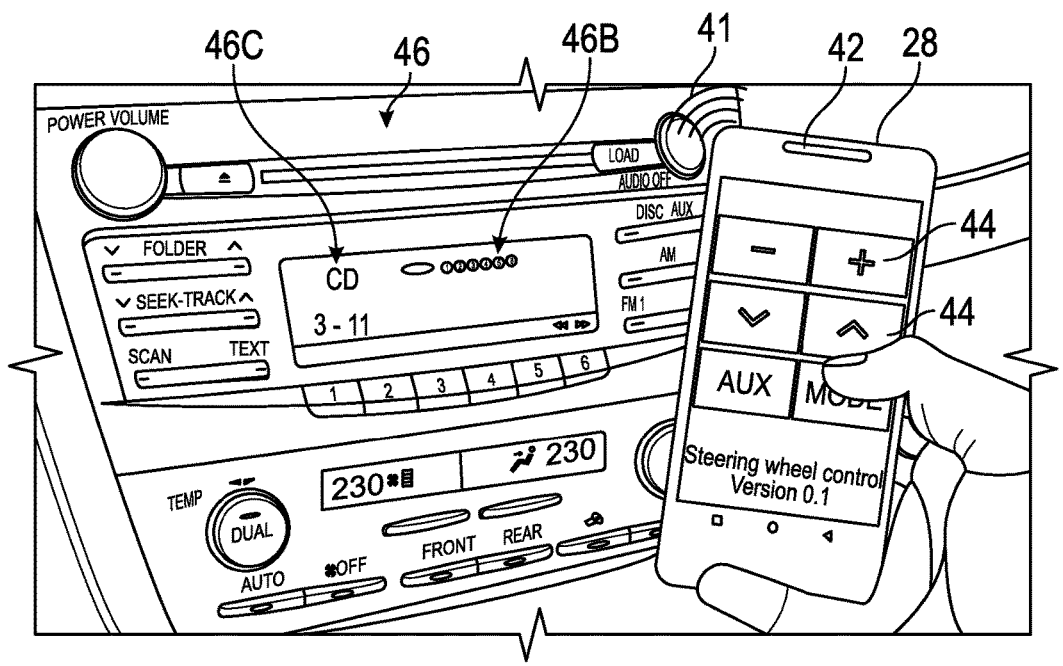

Referring now to FIGS. 3-5, the wireless device 28 may be configured with software, such as an application or an "app", configured to display multiple icons 44. Each icon 44 corresponds to one or more controllable features 46 of the audio device 18. The controllable features 46 may include, but should not be limited to, a volume selection 46A, a channel selection 46B, a mode selection 46C ("MODE"), and the like. Selecting one or more of the icons 44 on the wireless device 28, results in the transmitter 42 transmitting one or more data signals 43 to the interface device 10, via the wireless protocol 41 (as shown in FIG. 1). As already described above, once the wireless receiver 38 receives the data signals 43, the data signals 43 are processed and transmitted to the audio device 18. Therefore, when the audio device 18 is powered and a user of the wireless device 10 presses one of the icons 44 displayed on the display screen of the wireless device 28, the signal 43 sent by the wireless device 28 to the interface device 10 is ultimately communicated to the audio device 18. The audio device 18 may respond to the originally transmitted signal by modifying a corresponding audio characteristic. As such, the wireless device 28 may be operated by users external to the vehicle 14, e.g., while at the beach, camping, and the like, to change the volume of audio broadcast through the speakers, change a radio station, change a CD track, change a mode, and the like, without having to physically contact any component of the vehicle. Likewise, passenger occupants of the vehicle may use the wireless device 28 to change the audio characteristics.

The interface device 10 may be configured to be preprogrammed with the requisite algorithm 100, configured to transmit the appropriate audio command signal $V_{19}$ that corresponds to the desired change to an audio characteristic of the audio system 12. As such, the audio device 18 is configured to receive the audio command signal $V_{19}$ and subsequently generate an audio output signal $V_{20}$ that incorporates the desired changes to the audio characteristics, to be broadcast through the speakers 20A. As such, the audio device 18 within the vehicle 14 requires no additional programming, as the desired change to the audio characteristic is generated in the interface device 10 and transmitted to the audio device 18 as an audio command signal $V_{19}$, readily recognizable by the audio controller 15 of the audio device 18. Further, it should be appreciated that the interface device 10 may be equipped with an input 52 configured to receive software updates. The input 52 may be equipped to receive the updates via a wired connection, e.g., USB, etc., and/or via a wireless connection.

Referring again to FIGS. 1, 2, and 6, the vehicle 14 may also include at least one remote system 24. The remote system 24 includes multiple switches 50, operatively attached to the steering wheel 16. It should be appreciated that the remote system 24 may be located in other locations, besides, or in addition to, the steering wheel 16. By way of a non-limiting example, the remote system 24 may also be disposed on a rear of a center console, accessible by passengers of a second or third row of the vehicle 14. The remote system 24, including the switches 50, may be a factory installed remote system 24.

The switches 50 are electrically connected to the interface device 10, which is, in turn, electrically connected to the audio input port 19 of the audio device 18. The switches 50 may correspond to a desired change to one or more audio characteristics of the audio device 18, as already described above. As such, the switches 50 may be activated to change the volume, change a station or a track, change a mode, and the like.

When a user depresses one of the switches 50, a second voltage signal $V_{47}$ is transmitted directly to the CPU 30 of the interface device 10, as designated at 47. Once the CPU 30 receives the second voltage signal $V_{47}$, the CPU 30 executes the algorithm 100 and converts the second voltage signal $V_{47}$ into the audio command signal $V_{19}$, which is transmitted to the audio device 18 through the audio input port 19. Further, unlike the first voltage signal $V_{40}$, which has a value that must be converted by the CPU 30 to conform to an audio command signal $V_{19}$, recognizable by the audio device 18, the second voltage signal $V_{47}$ generated by the respective switch 50 is automatically a value that is recognizable by the audio device 18. The value of the second voltage signal $V_{47}$ is passed through the CPU 30, when becoming the audio command signal $V_{19}$. Therefore, when the second command signal $V_{47}$ is generated by one of the switches 50, the value of the audio command signal $V_{19}$ is equal to the value of the second voltage signal $V_{47}$. By way of one non-limiting example, selecting one of the switches 50 ultimately transmits an audio command signal $V_{19}$ to the audio device 18, indicating that the volume needs to increase.

Figure 6:
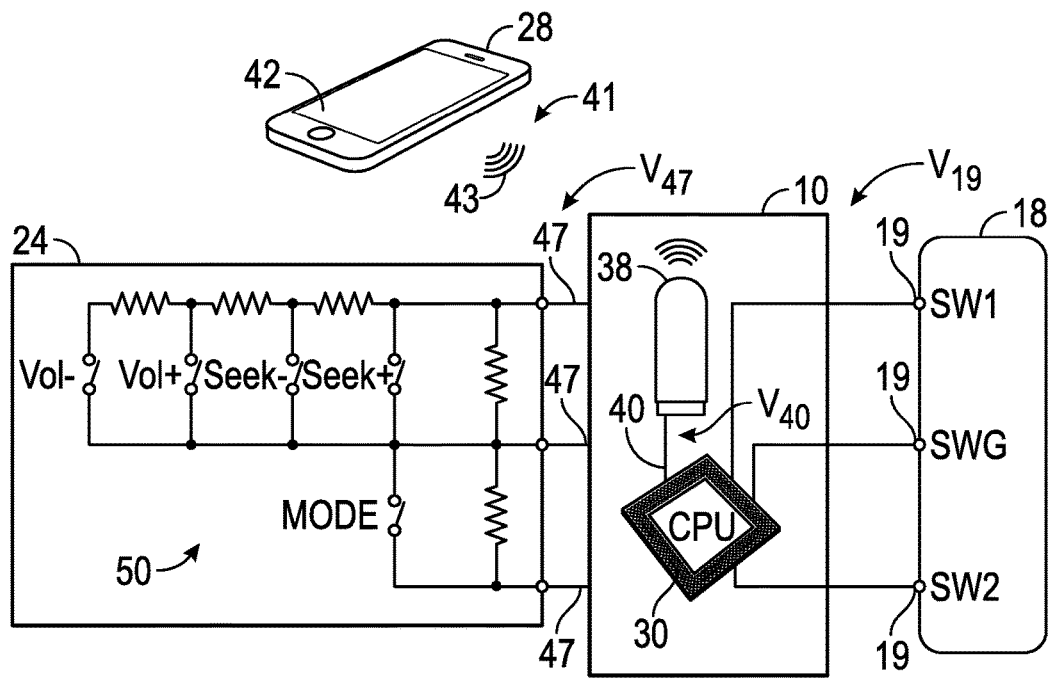
FIG. 6 is a schematic, diagrammatic view of the interface device operatively connected to a remote system and in wireless communication with the wireless device.

With reference to FIG. 6, the interface device 10 is configured to receive the second voltage signal $V_{47}$ from one of the switches 50 of the remote system 24 and generate the audio command signal $V_{19}$, which replicates the second voltage signal $V_{47}$, such that the audio device 18 changes its functionality (i.e., audio characteristic). As described above the vehicle 14 may be configured with a resistive remote system 24. As such, in the embodiment illustrated in FIG. 6, the CPU 30 is configured to replicate one of the five functions of the resistive remote system by replicating the specific resistance to match the intended function of the audio device 18. As illustrated in FIG. 6, the five functions may be to increase the volume "Vol+", decrease the volume "Vol−", seek a channel of a higher value "Seek+", seek a channel of a lower value "Seek−", and change the operating mode "Mode". It should be appreciated that the interface device 10 and the remote system 24 may be configured to selectively change any desired number of characteristics or functions within the vehicle 14. Further, the CPU 30 may be configured to replicate any number of characteristics or functions, input by the remote system 24.

Figure 7:
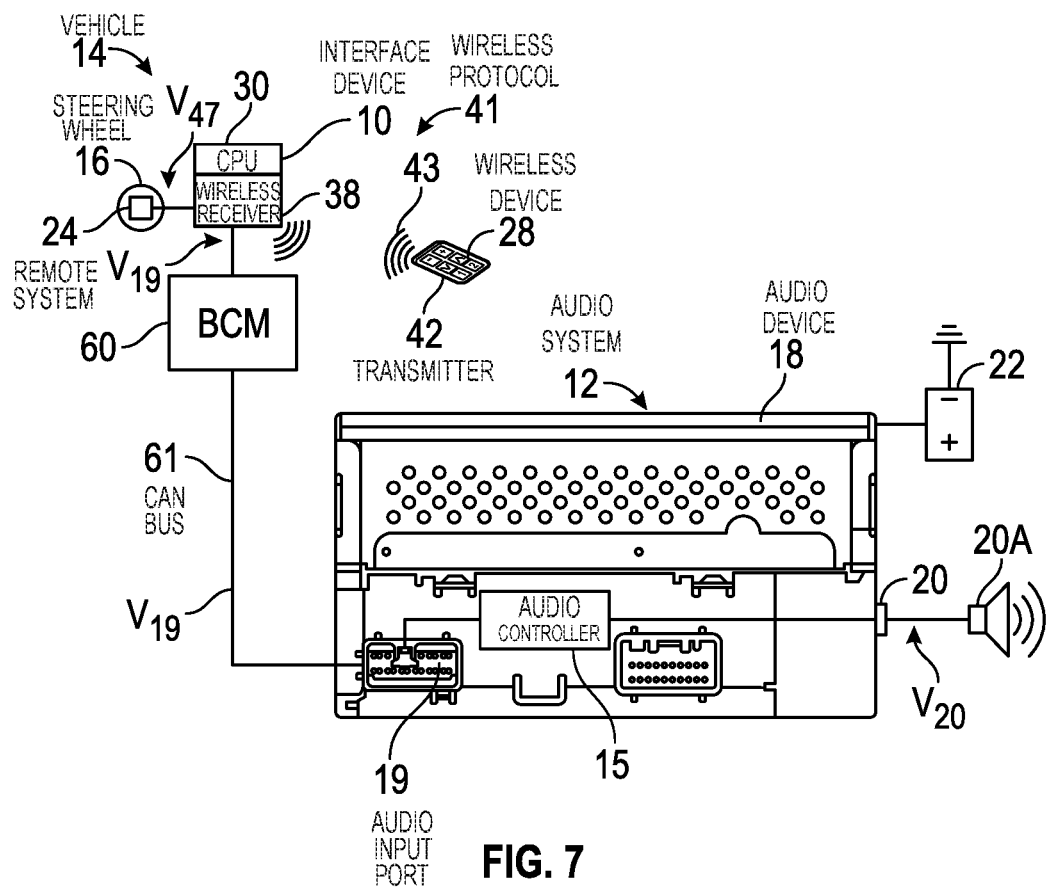
FIG. 7 is a schematic, diagrammatic view of the interface device attached to the audio system of the vehicle, via a CAN Bus.

Referring now to the embodiment illustrated in FIG. 7, the interface device 10 may be configured to operate on a CAN Bus 61 through a body controller 60, such as a body control module ("BCM"). In this configuration, the interface device 10 communicates the audio command signal $V_{19}$ to the BCM 60, through the CAN Bus 61. The BCM 60, in turn, transmits the command signal $V_{19}$ to the audio input port 19.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An interface device configured to be electrically connected to an audio device of a vehicle, the audio device configured to recognize each one of a plurality of predetermined voltage signals as corresponding with a respective change in a one of a plurality of audio characteristics and generate an audio output signal having the respective change in the one of the plurality of audio characteristics, in response to recognizing one of the predetermined voltage signals, the interface device comprising:
    a central processing unit (CPU); and
    a wireless receiver, electrically connected to the CPU through a first electrical connection;
    wherein the wireless receiver is configured to be wirelessly connected to a wireless device;
    wherein the wireless receiver is configured to:
        receive a wireless data signal from the wireless device corresponding to a respective change to the one of the plurality of audio characteristics;
        convert the wireless data signal to a first voltage signal; and
        transmit the first voltage signal to the CPU through the first electrical connection;
    wherein the first voltage signal is a voltage; and
    wherein, in response to receiving the first voltage signal from the wireless receiver, the CPU is configured to:
        transform the first voltage signal to an audio input signal corresponding to the one of the predetermined voltage signal recognizable by the audio device of the vehicle and corresponding to the respective change to the one of the plurality of audio characteristic;
wherein the audio input signal is a voltage that is not equal to the first voltage signal; and
transmit the audio input signal to the audio device such that the audio device within the vehicle outputs a corresponding audio signal;
wherein the CPU is configured to be electrically connected to a switch through a second electrical connection to receive a second voltage signal from the switch; and
wherein, in response to receiving the second voltage signal from the switch, the CPU is configured to:
recognize the second voltage signal as corresponding to the predetermined voltage signal recognizable by the audio device of the vehicle and corresponding to the respective change to the one of the plurality of audio characteristics;
generate the audio input signal, such that the voltage of the second voltage signal equals the voltage of the audio input signal; and
transmit the audio input signal to the audio device such that the audio device within the vehicle outputs the corresponding audio signal.

2. The interface device, as set forth in claim 1, wherein the wireless receiver is configured to receive radio frequency signals.

3. The interface device, as set forth in claim 2, wherein the wireless receiver is a Bluetooth receiver.

4. The interface device, as set forth in claim 2, wherein the wireless receiver is a WiFi receiver.

5. The interface device, as set forth in claim 1, wherein the respective change to the one of the plurality of audio characteristics is at least one of a respective change to a volume, a respective change to a radio station, and a respective change to a mode.

6. The interface device, as set forth in claim 5, wherein a respective change to a mode is a respective change from one of a radio mode, a satellite radio mode, a CD mode, an MP3 mode, and an auxiliary mode to another of the radio mode, the satellite radio mode, the CD mode, the MP3 mode, and the auxiliary mode.

7. A method of providing control of at least one of a plurality of audio characteristics of a vehicle audio device with an interface device, the method comprising:
electrically connecting the interface device to an input port of the vehicle audio device;
electrically connecting the interface device to at least one vehicle switch, wherein the at least one vehicle switch corresponds to a respective change to a one of the plurality of audio characteristics of the audio device within the vehicle;
wherein the interface device includes:
a central processing unit (CPU); and
a wireless receiver, electrically connected to the CPU through a first electrical connection;
wherein the wireless receiver is configured to receive a wireless data signal from a wireless device corresponding to the respective change to the one of the plurality of audio characteristics;
in response to the wireless receiver receiving the wireless data signal from the wireless device:
converting the wireless data signal to a first voltage signal; and
transmitting the first voltage signal to the CPU through the first electrical connection;
in response to the CPU receiving the first voltage signal from the wireless receiver:
transforming, by the CPU, the first voltage signal to an audio input signal, corresponding to a predetermined voltage signal recognizable by the audio device of the vehicle and corresponding to the respective change to the one of the plurality of audio characteristics;
wherein the audio input signal is a voltage that is not equal to the first voltage signal; and
transmitting the audio input signal from the CPU to the audio device of the vehicle; and
in response to the CPU receiving a second voltage signal from a switch in electrical communication with the CPU:
recognizing, by the CPU, the second voltage signal as corresponding to the predetermined voltage signal recognizable by the audio device of the vehicle and corresponding to the respective change to the one of the plurality of audio characteristics;
generating, by the CPU, the audio input signal, such that the voltage of the second voltage signal equals the voltage of the audio input signal; and
transmitting the audio input signal from the CPU to the audio device of the vehicle.

8. The method, as set forth in claim 7, wherein the wireless receiver is configured to receive radio frequency signals.

9. The method, as set forth in claim 8, wherein the wireless receiver is a Bluetooth receiver.

10. The method, as set forth in claim 8, wherein the wireless receiver is a WiFi receiver.

11. A method of operating an interface device to control an audio output signal generated by an audio device in a vehicle, the audio device configured to recognize a plurality of predetermined voltage signals from the interface device as corresponding with a respective change in a one of a plurality of audio characteristics and generate the audio output signal having the corresponding change in the one of the plurality of audio characteristics, in response to recognizing one of the predetermined voltage signals, the interface device including a central processing unit (CPU) and a wireless receiver electrically connected to the CPU through a first electrical connection, the method comprising:
in response to the wireless receiver receiving a wireless data signal from a wireless device corresponding to a respective change to the one of the plurality of audio characteristics:
converting the wireless data signal to a first voltage signal; and
transmitting the first voltage signal to the CPU through the first electrical connection;
wherein the first voltage signal is a voltage;
in response to the CPU receiving the first voltage signal from the wireless receiver:
transforming, by the CPU, the first voltage signal to an audio input signal, corresponding to the predetermined voltage signal recognizable by the audio device of the vehicle and corresponding to the respective change to the one of the plurality of audio characteristics;
wherein the audio input signal is a voltage that is not equal to the first voltage signal; and
transmitting the audio input signal from the CPU to the audio device; and in response to the CPU receiving a second voltage signal from a switch in electrical communication with the CPU:

recognizing, by the CPU, the second voltage signal as corresponding to the predetermined voltage signal recognizable by the audio device of the vehicle and corresponding to the respective change to the one of the plurality of audio characteristics;

generating, by the CPU, the audio input signal, such that the voltage of the second voltage signal equals the voltage of the audio input signal; and transmitting the audio input signal from the CPU to the audio device.

12. The method, as set forth in claim 11, wherein the wireless receiver is configured to receive radio frequency signals.

13. The method, as set forth in claim 11, wherein the wireless receiver is a Bluetooth receiver.

14. The method, as set forth in claim 11, wherein the wireless receiver is a WiFi receiver.

15. The method, as set forth in claim 11, wherein the respective change to the one of the plurality of audio characteristics is at least one of a respective change to a volume, a respective change to a radio station, and a respective change to a mode.

16. The method, as set forth in claim 15, wherein a respective change to a mode is a respective change from one of a radio mode, a satellite radio mode, a CD mode, an MP3 mode, and an auxiliary mode to another of the radio mode, the satellite radio mode, the CD mode, the MP3 mode, and the auxiliary mode.

* * * * *